United States Patent
Chang

(10) Patent No.: US 6,826,586 B2
(45) Date of Patent: Nov. 30, 2004

(54) METHOD FOR EFFICIENT COMPUTATION OF POINT DOUBLING OPERATION OF ELLIPTIC CURVE POINT SCALAR MULTIPLICATION OVER FINITE FIELDS F(2M)

(75) Inventor: Sheueling Chang, Cupertino, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 559 days.

(21) Appl. No.: 09/738,571

(22) Filed: Dec. 15, 2000

(65) Prior Publication Data

US 2002/0124031 A1 Sep. 5, 2002

(51) Int. Cl.$^7$ .............................................. G06F 7/72
(52) U.S. Cl. ................................ 708/491; 380/28
(58) Field of Search ............................ 708/491, 492; 380/28, 30

(56) References Cited

U.S. PATENT DOCUMENTS 6,252,959 B1 * 6/2001 Paar et al. .................... 380/28
6,490,352 B1 * 12/2002 Schroeppel .................. 380/30
2002/0044649 A1 * 4/2002 Gallant et al. ............... 380/30
2002/0057796 A1 * 5/2002 Lambert et al. ............. 380/28
2002/0062330 A1 * 5/2002 Paar et al. .................. 708/492

* cited by examiner

Primary Examiner—D. H. Malzahn
(74) Attorney, Agent, or Firm—Zagorin O'Brien Graham LLP

(57) ABSTRACT

The present invention provides a method for performing a point doubling operation with only one modular division and no multiply per operation. As a result, the invention reduces the number of mathematical operations needed to perform point doubling operations in elliptic curve computation. An elliptic curve cryptosystem using the present invention can be made to operate more efficiently using the present invention. An elliptic curve crypto-accelerator can be implemented using the present invention to dramatically enhance the performance of the elliptic curve cryptosystem. The invention derives the slope of a curve independently of the y-coordinate. By avoiding the calculation of the y term, one additional multiply is eliminated from each point-doubling operation. Using the invention, n consecutive point doublings can be reduced to n modular divisions and 1 multiply. This avoids the 2n multiplies of prior art approaches.

22 Claims, 3 Drawing Sheets

METHOD FOR EFFICIENT COMPUTATION OF POINT DOUBLING OPERATION OF ELLIPTIC CURVE POINT SCALAR MULTIPLICATION OVER FINITE FIELDS F(2M)

BACKGROUND OF THE INVENTION

1. Field of the Invention

The present invention relates to computation of a point doubling operation of elliptic curve point scalar multiplication.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Computer systems are useful for performing mathematical operations (add, subtract, multiply, divide) on operands. Often the operands are polynomials. A polynomial is a mathematical expression of one or more algebraic terms each of which consists of a constant multiplied by one or more variables raised to a nonnegative integral power (e.g. $\alpha+bx+cx^2$). The task of performing mathematical operations on polynomial operands is difficult in the sense that it is not simply a matter of multiplying or dividing two simple numbers. There are a number of schemes that provide methods for performing mathematical operations on polynomials. However, there are situations for which no suitable schemes have been provided.

One situation that requires the manipulation of polynomials is the encryption and decryption of data in a cryptosystem and digital signatures for verification of the sender. A cryptosystem is a system for sending a message from a sender to a receiver over a medium so that the message is "secure", that is, so that only the intended receiver can recover the message. A cryptosystem converts a message, referred to as "plaintext" into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. So long as only the sender and receiver have knowledge of the cipher key, such an encrypted transmission is secure.

A digital signature is a bit-stream generated by a cryptosystem. It is attached to a message such that a receiver of the message can verify with the bit-stream and be assured that the message was indeed originated from the sender it claims to be. A "classical" cryptosystem is a cryptosystem in which the enciphering information can be used to determine the deciphering information. To provide security, a classical cryptosystem requires that the enciphering key be kept secret and provided to users of the system over secure channels. Secure channels, such as secret couriers, secure telephone transmission lines, or the like, are often impractical and expensive.

A system that eliminates the difficulties of exchanging a secure enciphering key is known as "public key encryption." By definition, a public key cryptosystem has the property that someone who knows only how to encipher a message cannot use the enciphering key to find the deciphering key without a prohibitively lengthy computation. An enciphering function is chosen so that once an enciphering key is known, the enciphering function is relatively easy to compute. However, the inverse of the encrypting transformation function is difficult, or computationally infeasible, to compute. Such a function is referred to as a "one way function" or as a "trap door function." In a public key cryptosystem, certain information relating to the keys is public. This information can be, and often is, published or transmitted in a non-secure manner. Also, certain information relating to the keys is private. This information may be distributed over a secure channel to protect its privacy, (or may be created by a local user to ensure privacy). Some of the cryptosystems that have been developed include the RSA system, the Massey-Omura system, and the El Gamal system.

ELLIPTIC CURVES

Another form of public key cryptosystem is referred to as an "elliptic curve" cryptosystem. An elliptic curve cryptosystem is based on points on an elliptic curve E defined over a finite field F. Elliptic curve cryptosystems rely for security on the difficulty in solving the discrete logarithm problem. An advantage of an elliptic curve cryptosystem is there is more flexibility in choosing an elliptic curve than in choosing a finite field. Nevertheless, elliptic curve cryptosystems have not been widely used in computer-based public key exchange systems due to their late discovery and the mathematical complexity involved. Elliptic curve cryptosystems are described in "A Course in Number Theory and Cryptography" (Koblitz, 1987, Springer-Verlag, N.Y.).

In practice an Elliptic Curve group over Fields $F(_2m)$ is formed by choosing a pair of a and b coefficients, which are elements within $F(_2m)$. The group consists of a finite set of points $P(x,y)$ which satisfy the elliptic curve equation $$y^2+xy=x^3+ax^2+b$$

together with a point at infinity, O. The coordinates of the point, x and y, are elements of $F(_2m)$ represented in m-bit strings. Since $F(_2m)$ operates on bit strings and the field has a characteristic 2, computers can perform arithmetic in this field very efficiently. The arithmetic in $F(_2m)$ can be defined in either a standard basis representation or optimal normal basis representation. This description uses the standard basis representations for purposes of discussion. All elliptic curve point coordinates are represented as polynomials with binary coefficients.

The Elliptic Curve Cryptosystem relies upon the difficulty of the Elliptic Curve Discrete Logarithm Problem (ECDLP) to provide its effectiveness as a cryptosystem. Using multiplicative notation, the problem can be described as: given points P and Q in the group, find a number k such that $P^k=Q$; where k is called the discrete logarithm of Q to the base P. Using additive notation, the problem becomes: given two points P and Q in the group, find a number k such that $kP=Q$.

In an Elliptic Curve Cryptosystem, the large integer k is kept private and is often referred to as the secret key. The point Q together with the base point P are made public and are referred to as the public key. The security of the system, thus, relies upon the difficulty of deriving the secret k, knowing the public points P and Q. The main factor that determines the security strength of such a system is the size of its underlying finite field. In a real cryptographic application, the underlying field is made so large that it is computationally infeasible to determine k in a straight forward way by computing all the multiples of P until Q is found.

The core of the elliptic curve geometric arithmetic is an operation called scalar multiplication which computes kP by adding together k copies of the point P. The scalar multiplication is performed through a combination of point-doubling and point-addition operations. The point-addition operation adds two distinct points together and the point-doubling operation adds two copies of a point together. To compute, for example, 11 P=(2*(2*(2P)))+2P=P, it would take 3 point-doublings and 2 point-additions.

Point-doubling and point-addition calculations require special operations when dealing with polynomial operands. Algebraic schemes for accomplishing these operations are illustrated below in Table 1.

TABLE 1

| Point addition: R = P + Q | Point Doubling: R = 2P |
|---|---|
| $S = (y_P - y_Q) * (1/(x_P + x_Q))$ | $S = x_P + y_P * (1/x_P)$ |
| $x_R = s^2 + s + a + x_P + x_Q$ | $x_R = s^2 + s + a$ |
| $y_R = s * (x_P + x_R) + x_R + y_P$ | $y_R = x_P^2 + (s + 1) * x_R$ |
| If Q = −P, R = P + (−P) = O, infinity | If $x_P$ = O, then R = 2P = O, infinity |

The two equations for S in the table are called the slope-equations. Computation of a slope equation requires one modular polynomial inversion (1/X mod M) where M is an irreducible polynomial and one modular polynomial multiplication (*Y mod M). Because the operands are polynomials, these operations are typically done back-to-back as two separate operations. There exist algorithms and solutions to calculate the modular inversion 1/X mod M and the modular multiplication *Y mod M. After the result of the modular inversion is calculated, the multiplication *Y mod M is performed. Of course, algebraically (1/X*Y) mod M is the same as Y/X mod M. However, there is currently no technique for calculating modular Y/X in one operation when the operands are binary polynomial functions. These two field operations, the inversion and the multiply, are expensive computationally because they require extensive CPU cycles for the manipulation of two large polynomials modular a large irreducible polynomial. Today, it is commonly accepted that a point-doubling and point-addition operation each requires one inversion, two multiplies, a square, and several additions. To date there are techniques to compute modular inversions, and techniques to trade expensive inversions for multiplies by performing the operations in projective coordinates. There have been no efficient hardware oriented techniques suggested to compute a modular division directly which can be used to perform point doubling and point addition operations.

SUMMARY OF THE INVENTION

The present invention provides a method for performing a point doubling operation with only one modular division and no multiply per operation. As a result, the invention reduces the number of mathematical operations needed to perform point doubling operations in elliptic curve computation. An elliptic curve cryptosystem using the present invention can be made to operate more efficiently using the present invention. An elliptic curve crypto-accelerator can be implemented using the present invention to dramatically enhance the performance of the elliptic curve cryptosystem.

The invention derives the slope of a curve independently of the y-coordinate. By avoiding the calculation of the y term, one additional multiply is eliminated from each point-doubling operation. Using the invention, n consecutive point doublings can be reduced to n modular divisions and 1 multiply. This avoids the 2n multiplies of prior art approaches.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
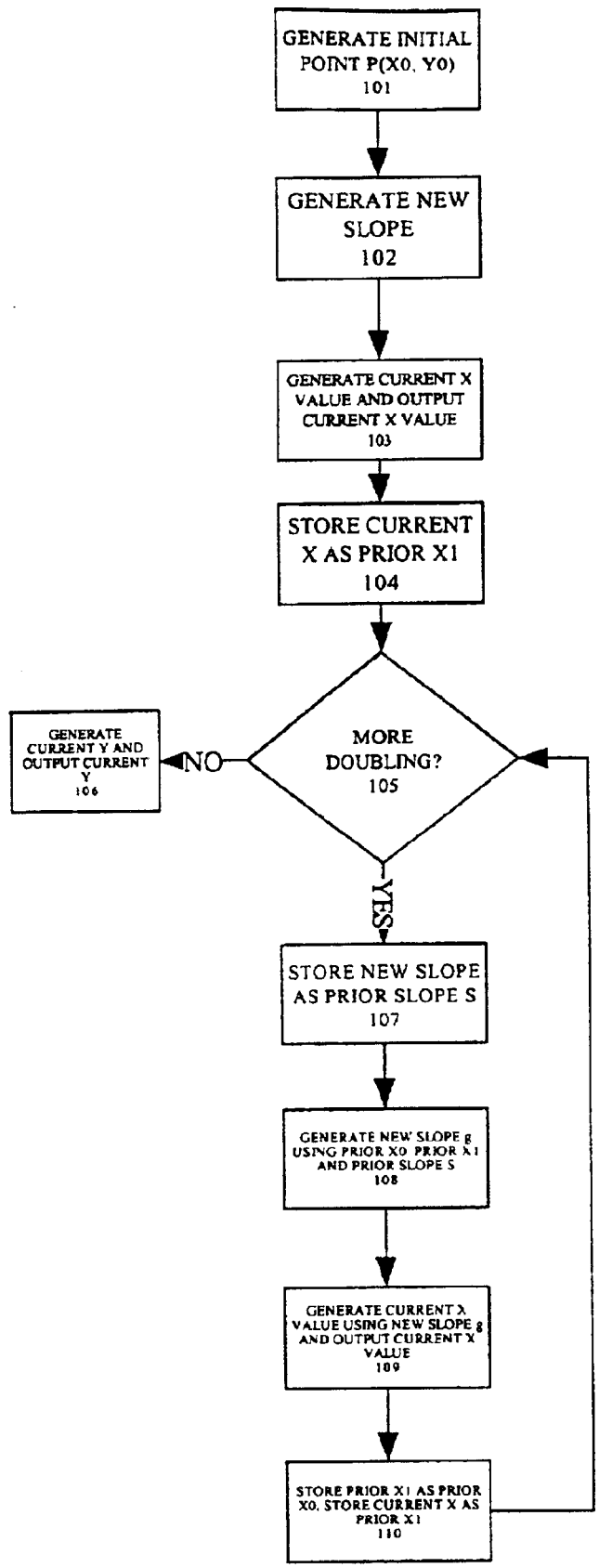
FIG. 1 is a flow diagram illustrating the operation of the present invention.

The invention is a method for efficient computation of elliptic curve scalar multiplication. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

The invention provides a system for performing point doublings with only one division operation and no multiplies per operation. The invention is described in connection with example operations from an elliptic curve cryptosystem.

Calculating Repeated Point Doublings

The conventional approach to repeated point-doublings, $2^nP$, is to compute both the x and y coordinates of a point at each step iteratively based on the standard slope equation s=x+y/x:

| Conventional Approach: | |
|---|---|
| $P_1 = 2P(x, y)$ | $s = x + y/x$ |
| | $x_1 = s^2 + s + a,$ |
| | $y_1 = x^2 + (s + 1)x_1$ |
| $P_2 (x_2, y_2) = 2P_1 (x_1, y_1)$ | $g = x_1 + y_1/x_1$ |
| | $x_2 = g^2 + g + a,$ |
| | $y_2 = x_1^2 + (g + 1) x_2$ |
| $P_3 = 2P_2$ | $r = x_2 + y_2/x_2,$ |
| | $x_3 = \ldots, y_3 = \ldots,$ |
| $\ldots$ | |
| $P_n = 2P_{n-1} (x_{n-1}, y_{n-1})$ | $w = \ldots,$ |
| | $x_n = w^2 + w + a,$ |
| | $y_n = x_{n-1}^2 + (w + 1) x_n$ |

It can be seen that both coordinates, x and y, are calculated at each step because the slope, s, in the table above is expressed in terms of the x and y coordinates of a point. The simplicity of this equation enables one to derive 2P with only the knowledge of the coordinates of point P. However, the calculation of the y term requires a multiplication operation.

The present invention takes advantage of the fact that both points P and $P_1$ are known. The y term of each new point is defined in terms of the new x term and the x term ($x_1$) of the previous point. The x term of each new point is defined in terms of the slope calculated for the previous point. Thus, the new x term and the new slope can be calculated without any use of the new y term. The invention derives an alternative slope equation by substituting $y_1=x^2+(s+1)x_1$ into the standard slope equation. This leads to:

$$g = x_1 + (x^2 + (s+1)x_1)/x_1 \quad \text{(Equation 1)}$$

$$= ((x_1^2 + x^2) + (s+1)x_1)/x_1 \quad \text{(Equation 2)}$$

$= (x_1^2 + x^2)/x_1 + ((s+1)x_1)/x_1$  (Equation 3)

$= ((x_1^2 + x^2)/x_1) + s + 1$  (Equation 4)

$= (x + x_1)^2/x_1 + s + 1$  (Equation 5)

Note that the transition from equation 4 to equation 5 is possible because the equation is a modulo polynomial. Algebraically, $(x+x_1)^2$ would expand into $x^2 + 2xx_1 + x_1^2$. In the modulo 2 environment, the $2xx_1$ term is equivalent to a zero term, leading to the result in equation 5. Note also that this new slope equation (equation 5) is free of the y-coordinate. It enables point-doublings to be repeated without having to compute the y-coordinate at each intermediate step, and thus, has no multiplication step.

| New Approach: $2^n$ P | |
|---|---|
| $P_1 = 2P(x, y)$ | $s = x + y/x$, $x_1 = s^2 + s + a$ |
| $P_2 = 2P_1 (x_1, y_1)$ | $g = (x + x_1)^2/x_1 + (s + 1)$, |
| | $x_2 = g^2 + g + a$, |
| $P_3 = 2P_2 (x_2, y_2)$ | $r = (x_2 + x_1)^2/x_2 + (g + 1)$, |
| | $x_3 = r^2 + r + a$ |
| ... | |
| $P_{n-1} (x_{n-1}, y_{n-1}) = ...$ | $q = ...$ |
| $P_n = 2P_{n-1} (x_{n-1}, y_{n-1})$ | $w = (x_{n-1} + x_{n-2})^2/x_{n-1} + (q + 1)$, |
| | $x_n = w^2 + w + a$, |
| | $y_n = x_{n-1}^2 + (w + 1) x_n$ |

As shown in the table above, the slope g for point $P_2$ is derived directly from s, x, and $x_1$ without involving the $y_1$ coordinate. Each point-doubling operation now requires only one divide, 2 squares, and no multiplies (except at the last point doubling calculation where y is needed for the subsequent point-addition operation).

| | Conventional approach | New approach |
|---|---|---|
| $2^{44} Q_1$ | 88 multiplies + 44 inverts | 1 multiplies + 44 inverts |
| $2^{66} Q_2$ | 132 multiplies + 66 inverts | 1 multiplies + 66 inverts |
| $2^{49} P$ | 98 multiplies + 49 inverts | 1 multiplies + 49 inverts |
| Total multiplies | 318 | 3 |

The multiplies are subsumed into other operations in various forms. In the case of the slope calculation, the slope is transformed into a different form in order to eliminate the y-coordinate. The new equation introduces a square operation into the system, which is non-trivial but negligible compared to the cost of a multiply.

An example of the efficiency gain is demonstrated by applying the invention to a scalar multiplication example. For example, assume Q=kP. Assume the scalar k is a 160-bit large integer:

$$k = (100...01110...01010...001101)$$
$$= ((1 * 2^{49} + 7) * 2^{66} + 5) * 2^{44} + 13$$

The invention first breaks up the binary bit-string of the scalar k into two kinds of windows, nonzero-windows and the zero-windows:

$$k = (\underline{1}\ 00\ ...\ 0\ \underline{111}\ 0\ ...\ 0\ \underline{101}\ 0\ ...\ 00\ \underline{1101})$$

The scalar multiplication can be decomposed into multiple iterations of repeated point-doublings and point-additions:

$$Q = kP = ((2^{49} * P + 7P) * 2^{66} + 5P) * 2^{44} + 13P$$
$$= 2^{44} Q_1 + 13P, \text{ where}$$
$$Q_1 = 2^{66} Q_2 + 5P \text{ and } Q_2 = 2^{49} P + 7P$$

A table look-up is an effective technique for eliminating point-additions. Using a small 4-bit look-up table, one can potentially eliminate up to 75% of the point-additions in the system. The size of a zero-window can be as large as it needs to be. The size of a nonzero-window is limited by the size of the look-up table used in the system. The points, 7P, 5P, and 13P can be fetched directly from a look-up table.

As can be seen from the table below, the calculation of $2^{49}$ P, $2^{44}$ $Q_1$, and $2^{66}$ $Q_2$ will require a total of 159 point doublings and consume significant computational resources. Using prior art techniques, this would require as many as 324 multiplies. Using the present invention, the total number of multiplies in this scalar multiplication is reduced to 6.

| | Conventional approach | New approach |
|---|---|---|
| 159 point-doublings | 318 multiplies + 159 inverts | 3 multiplies + 159 divides |
| 3 point-additions | 6 multiplies + 3 inverts | 3 multiplies + 3 divides |
| Total | 324 multiplies + 162 inverts | 6 multiplies + 162 divides |

Operation of the Invention

FIG. 1 is a flow diagram illustrating the operation of the present invention. At step 101 the initial point $x_0$, $y_0$ is generated. At step 102 a new slope is generated using the known x and y values. A current x value is generated and outputted at step 103. The current x is stored as the prior $x_1$ at step 104.

At decision block 105 it is determined if more point doubling is to be done. If not, at step 106 the current y is generated and outputted. If more point doubling is to be done, the system stores the new slope as prior slope s at step 107. At step 108 a new slope g is generated using the prior $x_0$, the prior $x_1$, and the prior slope s. The current x value is generated using the new slope g and is outputted as the current x value at step 109. At step 110, the prior $x_1$ is stored as the prior $x_0$ and the current x is stored as the prior $x_1$. After step 110, the system returns to step 105.

Figure 2:
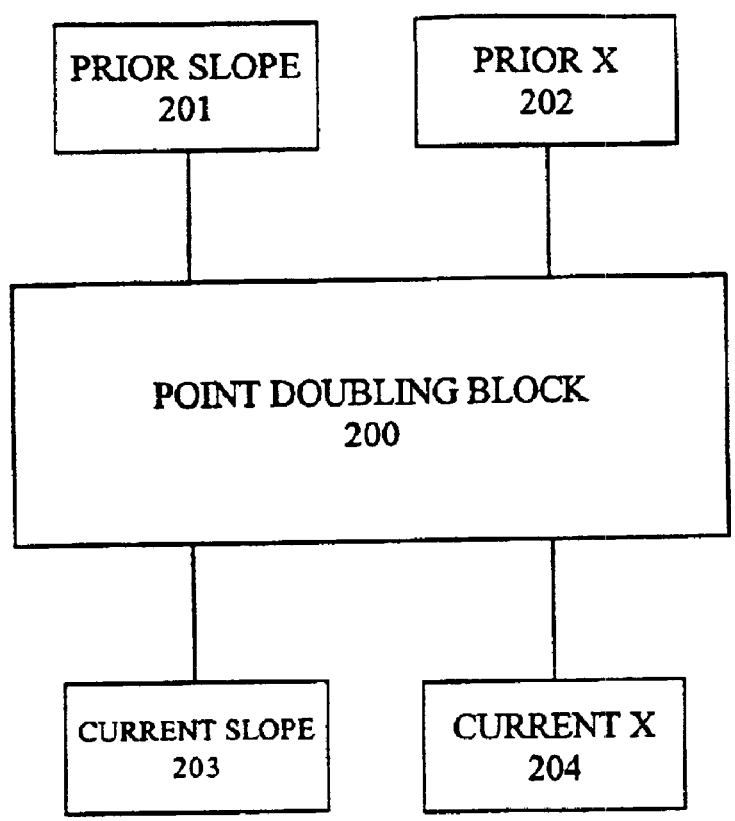
FIG. 2 is a block diagram illustrating an implementation of the present invention.

FIG. 2 is a block diagram of an embodiment of the invention. Point doubling block 200 is used to calculate slope and x values to accomplish point doubling determinations. Prior slope and x values are stored in memories 201 and 202. Current slope and x values are stored in memories 203 and 204.

Computer Environment

Figure 3:
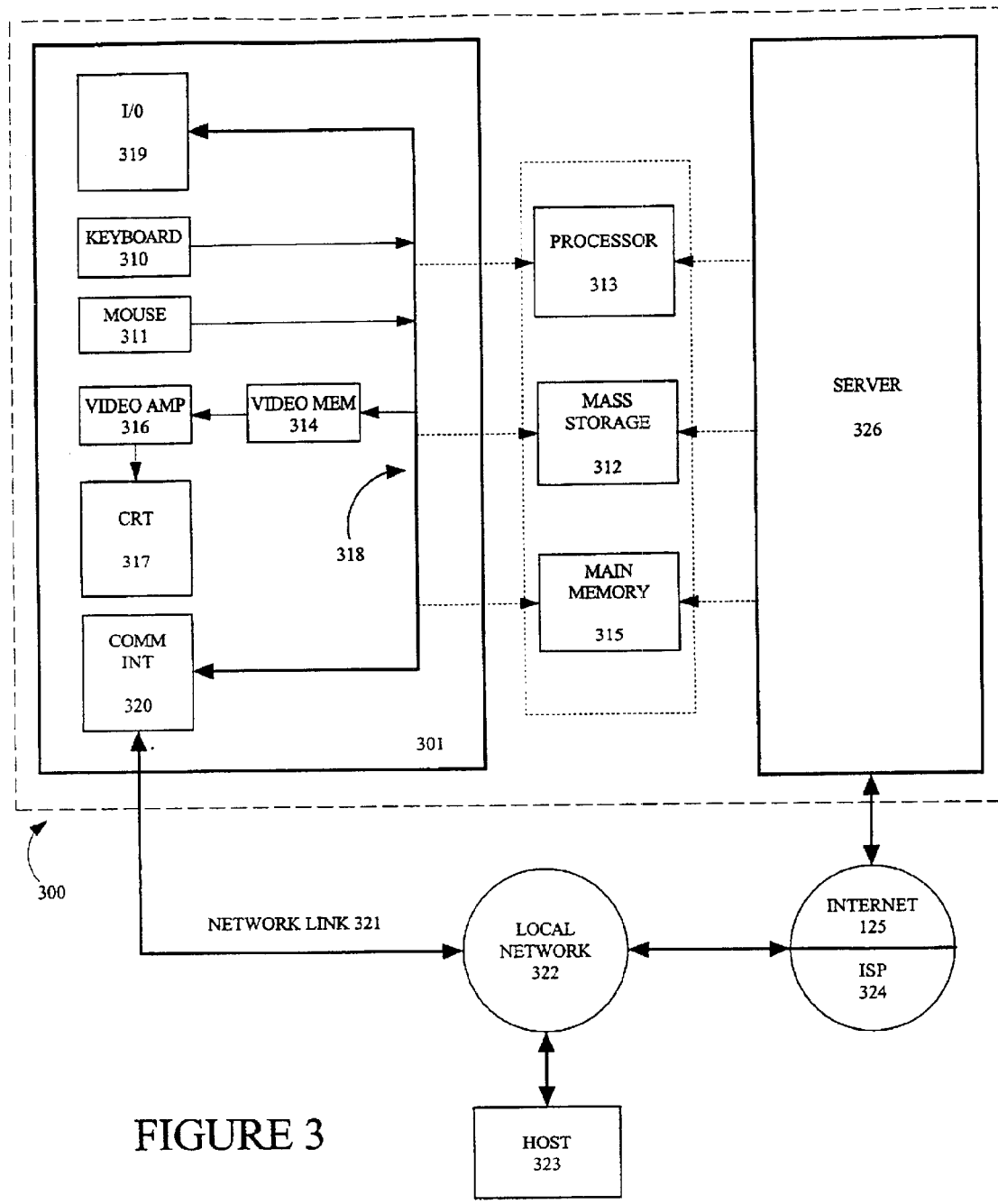
FIG. 3 illustrates an execution environment of the present invention.

An embodiment of the invention can be implemented as computer software in the form of computer readable code executed in a general purpose computing environment such as environment 300 illustrated in FIG. 3, or in the form of bytecode class files running in such an environment. A keyboard 310 and mouse 311 are coupled to a bi-directional system bus 318. The keyboard and mouse are for introducing user input to a computer 301 and communicating that user input to processor 313.

Computer 301 may also include a communication interface 320 coupled to bus 318. Communication interface 320 provides a two-way data communication coupling via a network link 321 to a local network 322. For example, if communication interface 320 is an integrated services digital network (ISDN) card or a modem, communication interface 320 provides a data communication connection to the corresponding type of telephone line, which comprises part of network link 321. If communication interface 320 is a local area network (LAN) card, communication interface 320 provides a data communication connection via network link 321 to a compatible LAN. Wireless links are also possible. In any such implementation, communication interface 320 sends and receives electrical, electromagnetic or optical signals which carry digital data streams representing various types of information.

Network link 321 typically provides data communication through one or more networks to other data devices. For example, network link 321 may provide a connection through local network 322 to local server computer 323 or to data equipment operated by ISP 324. ISP 324 in turn provides data communication services through the world wide packet data communication network now commonly referred to as the "Internet" 325. Local network 322 and Internet 325 both use electrical, electromagnetic or optical signals which carry digital data streams. The signals through the various networks and the signals on network link 321 and through communication interface 320, which carry the digital data to and from computer 300, are exemplary forms of carrier waves transporting the information.

Processor 313 may reside wholly on client computer 301 or wholly on server 326 or processor 313 may have its computational power distributed between computer 301 and server 326. In the case where processor 313 resides wholly on server 326, the results of the computations performed by processor 313 are transmitted to computer 301 via Internet 325, Internet Service Provider (ISP) 324, local network 322 and communication interface 320. In this way, computer 301 is able to display the results of the computation to a user in the form of output. Other suitable input devices may be used in addition to, or in place of, the mouse 311 and keyboard 310. I/O (input/output) unit 319 coupled to bi-directional system bus 318 represents such I/O elements as a printer, A/V (audio/video) I/O, etc.

Computer 301 includes a video memory 314, main memory 315 and mass storage 312, all coupled to bi-directional system bus 318 along with keyboard 310, mouse 311 and processor 313.

As with processor 313, in various computing environments, main memory 315 and mass storage 312, can reside wholly on server 326 or computer 301, or they may be distributed between the two. Examples of systems where processor 313, main memory 315, and mass storage 312 are distributed between computer 301 and server 326 include the thin-client computing architecture developed by Sun Microsystems, Inc., the palm pilot computing device, Internet ready cellular phones, and other Internet computing devices.

The mass storage 312 may include both fixed and removable media, such as magnetic, optical or magnetic optical storage systems or any other available mass storage technology. Bus 318 may contain, for example, thirty-two address lines for addressing video memory 314 or main memory 315. The system bus 318 also includes, for example, a 32-bit data bus for transferring data between and among the components, such as processor 313, main memory 315, video memory 314 and mass storage 312. Alternatively, multiplex data/address lines may be used instead of separate data and address lines.

In one embodiment of the invention, the processor 313 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 315 is comprised of dynamic random access memory (DRAM). Video memory 314 is a dual-ported video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable apparatus. This circuitry converts pixel data stored in video memory 314 to a raster signal suitable for use by monitor 317. Monitor 317 is a type of monitor suitable for displaying graphic images.

Computer 301 can send messages and receive data, including program code, through the network(s), network link 321, and communication interface 320. In the Internet example, remote server computer 326 might transmit a requested code for an application program through Internet 325, ISP 324, local network 322 and communication interface 320. The received code may be executed by processor 313 as it is received, and/or stored in mass storage 312, or other non-volatile storage for later execution. In this manner, computer 300 may obtain application code in the form of a carrier wave, Alternatively, remote server computer 326 may execute applications using processor 313, and utilize mass storage 312, and/or video memory 315. The results of the execution at server 326 are then transmitted through Internet 325, ISP 324, local network 322 and communication interface 320. In this example, computer 301 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method for efficient computation of elliptic curve point scalar multiplication has been described.

What is claimed is:

1. A method of performing point doublings in a computing system comprising:
   generating a first point doubling using an initial point (x, y) comprising generating a current slope value and a current x value;
   generating a second point doubling comprising generating a new current slope value with at least one square operation without computing a y coordinate, and generating a new current x value with the new current slope value.

2. The method of claim 1 wherein said generating said second point doubling comprises generating a new current x value and new current slope value without using a y term.

3. The method of claim 1 wherein said generating said second point doubling comprises storing said current x value as a prior x value and storing said current slope value as a prior slope value; generating a new current x value using said prior slope value; and generating a new current slope value using said new current x value and said prior x value.

4. The method of claim 3 wherein said new current x value is generated by:

$$x_1 = s^2 + s + a$$

where s is said prior slope value.

5. The method of claim 3 wherein said new current slope value is generated by:

$$g = (x+x_1)^2/x_1 + (s+1)$$

where x is said prior x value and x1 is said current x value.

6. A method of generating an nth point doubling for a point $(x_0, y_0)$ for a security value, the method comprising:

generating an initial slope with $slope_1 = x_0 + y_0/x_0$;

generating an initial $x_1$ with $slope_1^2 + slope_1 + A$, wherein A is a constant;

generating successive slopes with $slope_i = (x_{i-2} + x_{i-1})^2/x_{i-1} + (slope_{i-1} + 1)$, wherein i corresponds to succession;

generating successive x values with $x_i = (slope_i)^2 + slope_i + A$;

generating a final y value for the nth point doubling with $y_n = x_{n-1}^2 + (slope_n + 1) * x_n$; and supplying the final y value and the final x value for generation of a security value.

7. The method of claim 6 wherein the security value includes one or more of an encryption key and a value to determine an encryption key.

8. The method of claim 7 wherein generation of the nth point doubling is performed with squares and reciprocals and without multiplication.

9. The method of claim 6 wherein the successive slopes and the successive x values are generated without a y value.

10. The method of claim 6 wherein the point $(x_0, y_0)$ is an element of a field $F(_2m)$, wherein the x coordinate and the y coordinate are represented with m-bit strings.

11. The method of claim 6 embodied as a computer program product, encoded on one or more machine readable media.

12. A method of generating a security value comprising:

repeatedly performing reciprocals and squares to determine successive x values and successive slopes for ii point doublings of a point (x, y), wherein the successive slopes are determined in accordance with $slope_i = (x_{i-2} + x_{i-1})^2/x_{i-1} + (slope_{i-1} + 1)$ and the successive x values are determined in accordance with $x_i = (slope_i)^2 slope_i + A$, wherein i corresponds to succession; and generating $y_n$ from $x_n$, $x_{n-1}$, and $slope_n$, wherein $x_n$, $x_{n-1}$, and $slope_n$ have been determined with one or more preceding x values and one or more preceding slopes, wherein n corresponds to the number of point doublings.

13. The method of claim 12 further comprising decomposing a scalar multiplication Q=kP into point additions and repeated point doubling, which at least include the n point doublings, wherein P is represented by the coordinates (x, y).

14. The method of claim 13 further comprising separating k into zero windows and non-zero windows.

15. The method of claim 13 further comprising looking up the point additions in a look-up table.

16. The method of claim 13 wherein Q and P are security values for elliptic curve cryptography.

17. The method of claim 12 wherein the $y_n$ is generated with $y_n 32 x_{n-1}^2 + (slope_n 30 1) * x_n$.

18. The method of claim 12 embodied as a computer program product encoded on one or more machine-readable media.

19. An apparatus comprising:

memory; and means for performing repeated point doublings with successive slopes based on slopes and x values of preceding point doublings, but without y values, and successive x values based on corresponding ones of the successive slopes.

20. The apparatus of claim 19 wherein the memory hosts pre-computed point additions.

21. The apparatus of claim 19 further comprising means to decompose a scalar multiplication into one or more point doublings.

22. The apparatus of claim 21 further comprising means to decompose the scalar multiplication into point additions.

* * * * *

UNITED STATES PATENT AND TRADEMARK OFFICE
CERTIFICATE OF CORRECTION

PATENT NO. : 6,826,586 B2
DATED : November 30, 2004
INVENTOR(S) : Sheueling Chang It is certified that error appears in the above-identified patent and that said Letters Patent is hereby corrected as shown below:

Column 5,
Line 62, "k = ($\underline{1}$ 00 ... 0 $\underline{111}$ 0 ... 0 $\underline{101}$ 0 ... 00 $\underline{1101}$)" should read
-- k = (1 00 ... .. 0  111 0 ...  ... 0 101 0 ...  ... 00 1101) --.

Column 10,
Line 12, "doubling" should read -- doublings --.
Line 21, following "wherein the" delete "$y_n$is" and replace with -- $y_n$ is --.
Line 22, following "with" delete "$y_n$ 32 $x_{n-1}^2$" and replace with -- $y_n = x_{n-1}^2$ --.
Line 22, following "slope$_n$" delete "30" and replace with -- + --.

Signed and Sealed this

Twenty-sixth Day of April, 2005

JON W. DUDAS
*Director of the United States Patent and Trademark Office*